(12) United States Patent
Jakobsson

(10) Patent No.: US 6,587,946 B1
(45) Date of Patent: Jul. 1, 2003

(54) METHOD AND SYSTEM FOR QUORUM CONTROLLED ASYMMETRIC PROXY ENCRYPTION

(75) Inventor: Markus Bjorn Jakobsson, Hoboken, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/222,716

(22) Filed: Dec. 29, 1998

(51) Int. Cl.[7] ................................................. H04L 9/00
(52) U.S. Cl. ........................ 713/180; 380/286; 713/156
(58) Field of Search ................................ 380/278, 282, 380/285, 286; 713/180, 170, 153

(56) References Cited

U.S. PATENT DOCUMENTS

| | | | | |
|---|---|---|---|---|
| 5,625,692 A | * | 4/1997 | Herzberg et al. ............. | 380/21 |
| 6,049,613 A | * | 4/2000 | Jakobsson .................... | 380/28 |
| 6,061,451 A | * | 5/2000 | Muratani et al. ........... | 380/201 |
| 6,084,969 A | * | 7/2000 | Wright et al. ............... | 340/7.21 |
| 6,363,479 B1 | * | 3/2002 | Godfrey et al. ............. | 713/160 |
| 6,487,658 B1 | * | 11/2002 | Micali ......................... | 713/158 |
| 2002/0013898 A1 | * | 1/2002 | Sudia et al. ................. | 713/155 |

OTHER PUBLICATIONS

Schneier, Applied Cryptography, 1996, John Wiley and Sons, pp. 34–38, 68–73, 480–481, 527–531.*
M. Blaze, M. Strauss, "Atomic Proxy Cryptography," Manuscript of Aug. 1997.
M. Blaze, Gerrit Bleumer, Martin Strauss, "Divertible Protocols and Atomic Proxy Cryptography", Advances in Cryptology—EUROCRYPT '98, May/Jun. 1998.

* cited by examiner

*Primary Examiner*—Gilberto Barrón
*Assistant Examiner*—Douglas Meislahn

(57) ABSTRACT

A method of forwarding an encrypted message sent to a primary recipient having a secret key to at least one secondary recipient comprising the steps of sharing portions of the secret key among a predetermined threshold number of proxy servers greater than one, upon receipt of an encrypted message by the predetermined threshold number of proxy servers, each of the predetermined threshold number of proxy servers modifying the message by applying the key portion to the encrypted message, the result of the modification comprising a message secret to the predetermined threshold number of proxy servers but decryptable by at least one secondary recipient, and forwarding the resultant message to at least one secondary recipient. This method and system for quorum controlled asymmetric proxy encryption has uses ranging from efficient key distribution for pay-tv, to methods for distributively maintaining databases. The scheme, which can use either an ElGamal, or an ElGamal encryption based on Elliptic Curves or an ElGamal related encryption algorithm, leaks no information as long as there is no dishonest quorum of proxy servers.

30 Claims, 2 Drawing Sheets

METHOD AND SYSTEM FOR QUORUM CONTROLLED ASYMMETRIC PROXY ENCRYPTION

TECHNICAL FIELD

This invention relates to quorum controlled asymmetric proxy cryptography for use in encrypting and decrypting transcripts.

BACKGROUND OF THE INVENTION

Blaze et al. introduce the notion of proxy cryptography in M. Blaze, G. Bleumer, M. Strauss, "Atomic Proxy Cryptography," *EUROCRYPT* '98, pp. 127–144. In their model of proxy cryptography, there is an entity—the proxy—that can transform a transcript from being associated with a primary recipient to afterwards being associated with at least one secondary recipient. A "transcript" can be any type of electronic file that is sent from an originator to the primary recipient via a communications system. As a result, the transcript will have "associated" with it the primary recipient's address that is used within the communications system. Examples of a transcript that it may be valuable to transform in this manner are E-mail messages, encryptions, identification proofs, and signatures. For E-mail messages and encryptions, the transcript may be transformed from an encryption using the proxy's key to an encryption of the same message using the secondary recipient's key; for identification proofs and signatures, the transcripts may be transformed from being associated with the originator, to instead being associated with the proxy. Blaze et al. define both symmetric and asymmetric proxy cryptography. For "symmetric proxy cryptography," given the key used for transformation, the secret key of one party of the transformation can be derived from the secret key of the other. Conversely, in "asymmetric proxy cryptography," each party only needs to know his or her own secret key, or some transformation key derived from this. Therefore, asymmetric proxy cryptography is naturally better suited for many applications. However, while several symmetric constructions are provided by Blaze et al., there is merely a suggestion that asymmetric proxy cryptography exists.

Information is available on cryptographic techniques used in proactive security (for example, Y. Frankel, P. Gemmell, P. MacKenzie, M. Yung, "Proactive RSA," *Proc. of CRYPTO* '97, pp. 440–454; A. Herzberg, S. Jarecki, H. Krawcyk, M. Yung, "Proactive Secret Sharing, or How to Cope with Perpetual Leakage," *CRYPTO* '95, pp. 339–352; and A. Herzberg, M. Jakobsson, S. Jarecki, H. Krawczyk, M. Yung, "Proactive Public Key and Signature Systems," *Proceedings of the 4th ACM Conference on Computer and Communications Security,* 1997, pp. 100–110), on methods for undeniable signatures (for example, D. Chaum, H. Van Antwerpen, "Undeniable Signatures," *CRYPTO* '89, pp. 212–216; and D. Chaum, "Zero-Knowledge Undeniable Signatures," EUROCRYPT '90, pp. 458–464), Schnorr signatures (C. P. Schnorr, "Efficient Signature Generation for Smart Cards," *Advances in Cryptology—Proceedings of CRYPTO* '89, pp. 239–252), methods for information-theoretical secret sharing (T. P. Pedersen, "A threshold cryptosystem without a trusted party," D. W. Davies, editor, *Advances in Cryptology—EUROCRYPT* '91, volume 547 of *Lecture Notes in Computer Science,* pp. 522–526. Springer-Verlag, 1991), and mobile attackers (R. Ostrovsky and M. Yung, "How to withstand mobile virus attacks," *Proceedings of the* 10th *ACM Symposium on the Principles of Distributed Computing,* 1991, pp. 51–61.

Shamir introduces a (k,n) threshold scheme in A. Shamir, "How to Share a Secret," *Communications of the ACM,* Vol. 22, 1979, pp. 612–613. See also, T. P. Pedersen, *EUROCRYPT* '91, pp. 522–526.

ElGamal introduces the ElGamal encryption algorithm in T. ElGamal, "A Public-Key Cryptosystem and a Signature Scheme Based on Discrete Logarithms," *CRYPTO* '84, pp. 10–18.

Bellare et al. introduce methods that show how a non-interactive proof can be proven zero-knowledge in the random oracle model in M. Bellare, P. Rogaway, "Random Oracles are Practical: a paradigm for designing efficient protocols," 1st *ACM Conference on Computer and Communications Security,* pp. 62–73, 1993.

The shortcomings of existing E-mail systems are well known, for example, in one existing E-mail system incoming E-mail messages are protected with a public key encryption and sent directly to the primary recipient's mailbox. A problem with this scheme arises when the primary recipient leaves or is absent for an extended period of time and E-mails sent to the primary recipient are needed. In this instance, the contents of the E-mails can not be accessed by any other users, unless they have the absent primary recipient's secret key. Thus, the information contained in these E-mails, regardless of how urgently it is needed or vitally important it is to an organization is inaccessible until the primary recipient returns or his secret key is obtained.

Another existing E-mail system uses a single system administrator to distribute incoming E-mail messages to the intended primary recipients. This configuration can experience similar problems with those of the above described system if, for example, distribution of the E-mail is controlled by a single system administrator with the secret key and this system administrator leaves or is absent. In addition, in this system, the system administrator has total, unrestricted access to all E-mail messages in the system. While the problem of a missing system administrator can be overcome by having multiple E-mail system administrators (all of whom possess knowledge of the secret key), it multiplies the security problems by increasing the number of people who have unrestricted access to the E-mail system and, thus, makes confidential communications between parties less secure.

In another existing E-mail system, a group of system administrators are needed to distribute the E-mail. Incoming E-mail can be decrypted by the group of system administrators only if the entire group agrees and each uses their portion of the secret key to decrypt their associated portion of the E-mail message. Therefore, if an E-mail message in the primary recipient's mailbox needs to be forwarded on, and the primary recipient is not available, all of the group of system administrators must decrypt their respective portions of the message, combine the results, and then forward the message to the necessary secondary recipients. A major problem with this system is that all of the system administrators must be available and once the decryption is finished, each system administrator in the group of system administrators has unrestricted access to the complete E-mail message.

Finally, in an existing symmetric proxy encryption system the proxy holds a key that allows him to transform the transcripts, but which also allows him to compute the secret key of the secondary recipient, given knowledge of the proxy's own secret key. This, also, allows the secondary recipient to compute the secret key of the primary recipient or proxy server in a similar manner. This type of proxy encryption is disadvantageous in situations where there is no symmetric trust (or little trust at all). It also forces the participants to establish the shared transformation key ahead of time. The only advantage of a solution of this type appears to lie mainly in a potential improvement in efficiency, caused by the merging of the two decrypt and encrypt operations into one re-encryption operation performed during the transformation phase.

The above techniques and systems fail to provide effective and secure access to and forwarding of received transcripts from the primary recipient when the primary recipient is not available. Therefore, there is a need for a system and new techniques to provide asymmetric proxy cryptography for use in encrypting and decrypting transcripts.

SUMMARY OF THE INVENTION

My work extends the work of Blaze et al., that introduces the notion of proxy cryptography, demonstrates that symmetric proxy transformations exist, and conjectures that asymmetric proxy transformations also do exist. I demonstrate that asymmetric proxy transforms do indeed exist.

A proxy is an entity that is composed of one or more individuals called proxy servers. "Proxy servers" perform the transformation of transcripts from being associated with a primary recipient to afterwards being associated with at least one secondary recipient. In one embodiment of the present invention, a quorum of proxy servers is selected from the available group of proxy servers to perform the transformation function. The "quorum of proxy servers" can consist of any and all non-empty subsets of proxy servers from the group of proxy servers. The exact membership of the quorum does not need to be identified until the time of the transformation, however, the minimum number of members in the quorum must be specified by the primary recipient before the secret key is shared among a quorum of the proxy servers. At the time of transformation, the system will dynamically allocate "shares" of the secret key to a quorum of the currently available proxy servers in the group of proxy servers based on the minimum number of required members specified by the primary recipient. For example, in a group of five (5) proxy servers, the primary recipient could specify that a minimum of three (3) proxy servers would constitute a quorum, and the secret key would be shared between these three proxy servers or, alternatively, the secret key could be shared between four or five proxy servers. While, in the present invention, the proxy is intended to consist of more than one proxy server, the present invention is still applicable to a single proxy server.

I focus on asymmetric proxy encryption, where for security, the transformation is performed under quorum control by a quorum of proxy servers. This guarantees that if there is not a dishonest quorum, then the plaintext message whose encryption is being transformed is not revealed to the proxy servers. My solution is efficient, allows tight control over actions (by the use of quorum cryptography), does not require any pre-computation phase to set up shared keys, and has a trust model appropriate for a variety of settings.

Consequently, my method and system for forwarding secret key-encrypted messages from a primary recipient to a secondary recipient, without disclosing the underlying encrypted message, solves the above-mentioned deficiencies in the prior art system. My method and system involves sharing portions of the secret key among a predetermined number of proxy servers and, upon receipt of an encrypted message by the proxy servers, each proxy server modifies the message by applying their individual share of the key portion to the encrypted message. The result of this modification is a message that is secret to the proxy servers but is decryptable by the secondary recipient.

There are two types of asymmetric proxy transformations. In the first, which is merely theoretical, the message of the initial encryption can be hidden from the proxy by not requiring the proxy to know the decryption key corresponding to the proxy's own public key (but where the proxy is still able to perform the transformation). In the second, in which the proxy is distributed and all actions are quorum controlled, the message of the encryption is hidden from a "sufficiently honest" proxy. The second, in which the control is held by a quorum of proxy servers, has efficient solutions and I elaborate on such an embodiment herein.

Such a mechanism is useful in many applications For example:

- It allows the proxy to transform encrypted messages to encryptions with a variety of different recipient public keys, to allow for categorization of the encryptions. The categorization may be performed either as a function of the transcripts and their origins, randomly (for example, assigning an examiner to an electronically submitted patent), or as a function of time, and may be used to sort the encrypted messages according to priority or security clearance.
- It allows more efficient communication to a large number of recipients that are physically clustered around the proxy; the sender would only need to send one encryption, along with an authenticated list of recipients. This may prove very useful for pay-tv, general multi-cast, and related applications.
- It can be used for escrow encryption to separate the power of who can transform an encrypted message into a new transcript and who can read the plaintext message corresponding to such a transcript.
- Last but not least, I believe that asymmetric proxy encryption may become a useful building block in the design of secure and efficient multi-party protocols.

DETAILED DESCRIPTION

Figure 1:
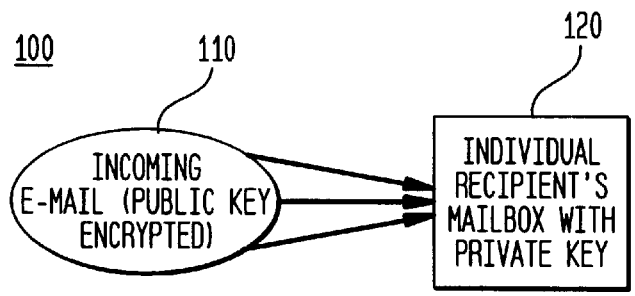
FIG. 1 illustrates a prior art E-mail system without system administrator distribution of E-mail to the recipients.

FIG. 1 shows a prior art E-mail system 100 without system administrator distribution of E-mail and where each recipient in the system is the sole possessor of their secret key. Incoming E-mail 110 with a public key encryption is sent directly to the primary recipient's mailbox 120. A problem with this scheme arises when the primary recipient leaves or is absent for an extended period of time and the E-mail sent to the primary recipient is needed. In this instance, the contents of the E-mails can not be accessed by any other users, unless they have the absent primary recipient's secret key.

Figure 2:
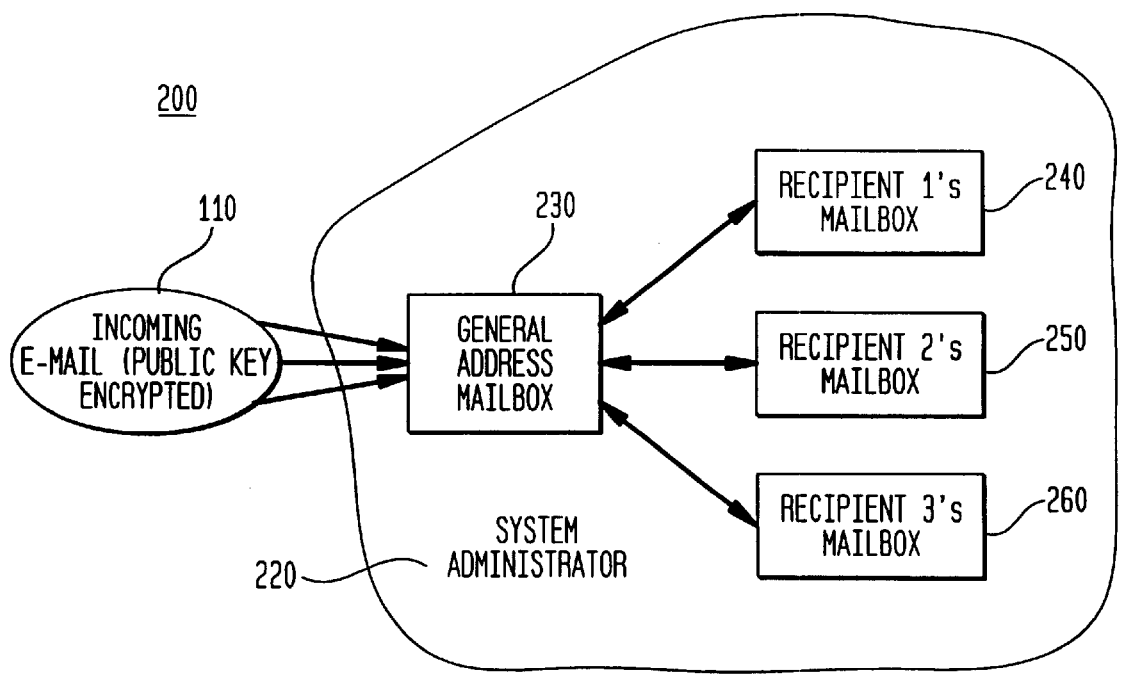
FIG. 2 illustrates another prior art E-mail system with a single system administrator distribution of E-mail to the recipients.

FIG. 2 shows another prior art E-mail System 200 with a single system administrator 220 distribution of E-mail where incoming E-mail 110 is sent to a general address mailbox 230 and then distributed to the individual recipient's mailboxes 240, 250 and 260 by the system administrator 220 with the necessary secret key. This configuration can experience similar problems with those of the system in FIG. 1 if, for example, distribution of the E-mail is controlled by a single system administrator 220 with the secret key and this system administrator 220 leaves or is absent. While this problem can be overcome by having multiple E-mail system administrators (all of whom possess knowledge of the secret key), it creates new security problems by increasing the number of people who have unrestricted access to the E-mail system and, thus, makes confidential communications between parties less secure.

Figure 3:
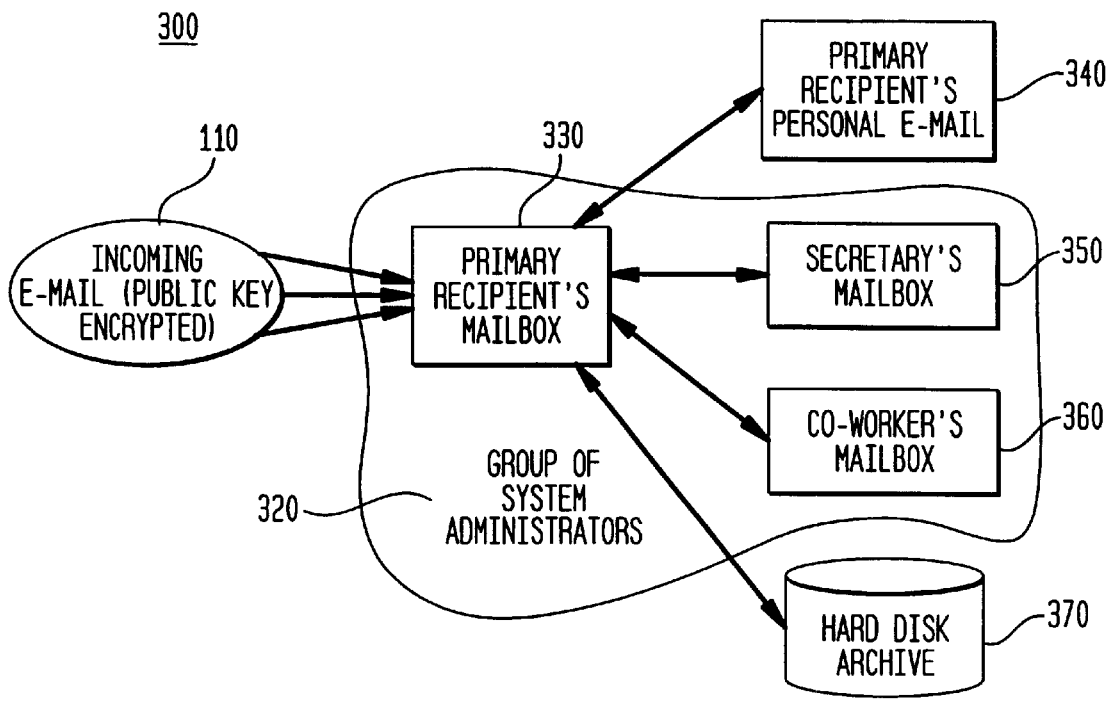
FIG. 3 illustrates a prior E-mail system with a group of system administrators distributing the E-mail to the recipients.

FIG. 3 shows another prior art E-mail system 300 with a group of system administrators 320 all being needed to distribute the E-mail. Incoming E-mail 110, which is public key encrypted, is sent to the primary recipient's mailbox 330. In this configuration a group of system administrators 320 runs the E-mail system 300. Each system administrator only has a portion of the secret key needed to decrypt the primary recipient's E-mail messages. Incoming E-mail 110 can be decrypted by the group of system administrators 320 only if the entire group agrees and each uses their portion of the secret key to decrypt their associated portion of the E-mail message 110. Therefore, if an E-mail message 110 in the primary recipient's mailbox 330 needs to be forwarded on, and the primary recipient is not available, all of the group of system administrators 320 must decrypt their respective portions of the message, combine the results, and then forward the message to the necessary secondary recipients. In FIG. 3, for example, these secondary recipients can include an external individual recipient's personal E-mail address 340, an internal secretary's mailbox 350, an internal co-worker's mailbox 360, and/or an external (local or network) harddisk archive 370. A major problem with this system is that all of the system administrators must be available and once the decryption is finished, each system administrator in the group of system administrators 320 has unrestricted access to the complete E-mail message 110. It is also important that the decrypted message be re-encrypted since the message may be susceptible to eavesdroppers when it is sent outside of the organization over an insecure channel, for example, to the primary recipient's personal E-mail 340 at his home.

The deficiencies in the early prior art encryption schemes spurred the development of proxy encryption schemes. "Proxy encryption" or "proxy cryptography" involves a proxy, an entity other than the primary recipient, having a key that enables the proxy to transform transcripts from being associated with the primary recipient to afterwards being associated with at least one secondary recipient. The proxy is comprised of one or more individuals called proxy servers who perform the transcript transformation. In one embodiment of the present invention, a quorum of proxy servers is selected from an available group of proxy servers to perform the transformation function. The "quorum of proxy servers" can consist of any and all non-empty subsets of proxy servers from the group of proxy servers. While, in the present invention, the proxy is intended to consist of more than one proxy server, the present invention is still applicable to a single proxy server.

Alternative systems to overcome the deficiencies in the prior art using proxy cryptography will now be discussed in some detail.

There are three possible settings for asymmetric proxy encryption, and these are discussed below.

The first setting is a theoretical asymmetric setting in which the proxy can only transform transcripts and is not able to decrypt the transcripts by himself. Obviously, this requires a pre-computation phase in which some transformation key is established between the proxy and the primary recipient; otherwise, the existence of such a transformation algorithm would constitute an attack on the corresponding encryption scheme, as it would allow the proxy to transform an encryption which the proxy could not decrypt into an encryption for which the proxy holds the secret key (since the assumption is that the proxy can transform transcripts to be associated with an arbitrary public key of a given format.) In addition to the necessity of a pre-computation phase, a second shortcoming of this setting is that there is no known practical solution for it. Clearly, it is theoretically possible to construct a transformation algorithm of this type: For example, let the two parties, the proxy and the primary recipient, engage in a secure multi-party computation in which the proxy receives a "dictionary" of transformation pairs. Note that this can be generated without knowledge of the secret key corresponding to the proxy's public key if for each possible output transcript (which is readable by the secondary recipient), the corresponding input transcripts are constructed. In a second phase, the proxy would simply look up the transformation of any transcript using this dictionary. However, this type of solution appears to generate exponential-sized transformation keys in the size of the input strings for all known encryption schemes.

The second setting also uses a theoretical asymmetric proxy encryption, where the proxy is one physical party, and the proxy has the key that allows him to decrypt the transcript. Such a solution requires a certain amount of trust, since the proxy is able to read the messages sent to the primary recipient. Therefore, this type of solution appears to be advantageous mainly as a means for speed-up due to merging the decrypting and encrypting operations into one operation.

Finally, my third setting, which is embodied in the present invention, is an asymmetric setting like the above, but where the proxy is distributed and the transformation is controlled by the use of quorum action. In this setting, it is not necessary to trust the proxy: the primary recipient only has to trust that there is no dishonest quorum of proxy servers. A solution of this type requires no pre-computation, can hide the message from the quorum of proxy servers, and therefore, adds functionality in a less stringent trust model.

Figure 4:
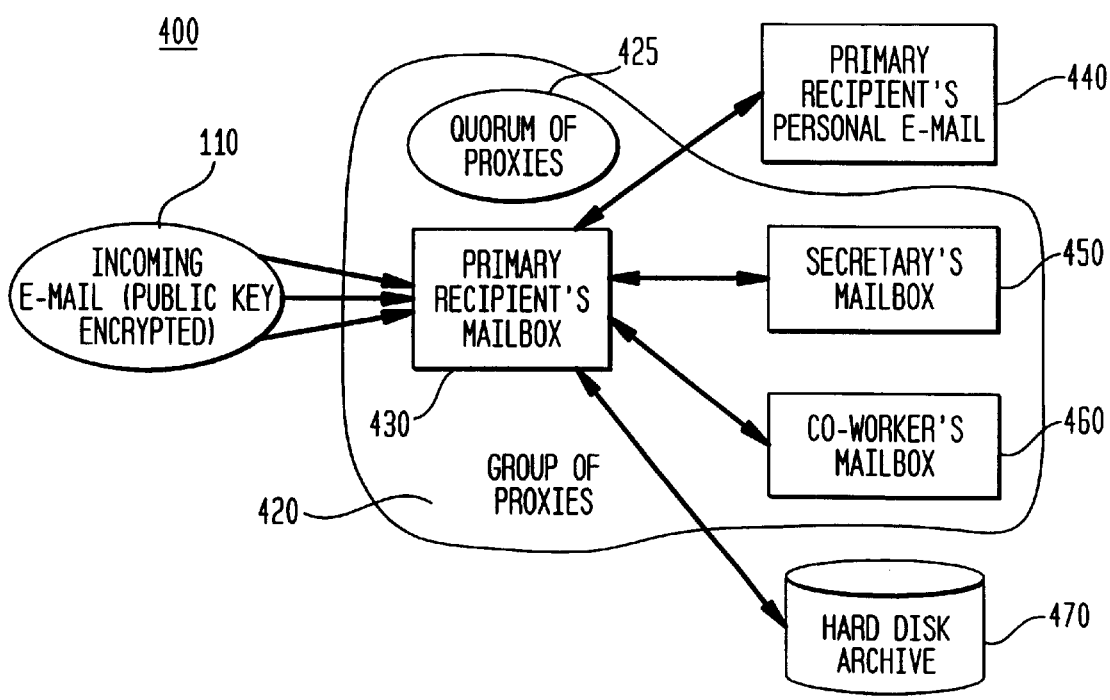
FIG. 4 illustrates an E-mail system in which an embodiment of the inventive method may be practiced and which is exemplary of other communication systems in which the inventive method may also be practiced.

FIG. 4 shows an E-mail system 400 in which an embodiment of the inventive asymmetric proxy encryption method may be practiced. The E-mail system 400 depicted in FIG. 4 is representative of communication systems generally and may not be representative of each and every existing communication system. However, one of ordinary skill in the art may adapt the teachings from the following discussion to encompass each E-mail or other communication system that is adapted to employ a quorum controlled proxy encryption system of the present invention. In general, the E-mail or other communication system is implemented on a programmable computer system that is connected, via communication lines, to other programmable computer systems. The processing for the quorum controlled proxy encryption system is performed either as a centralized system or as a distributed system. The greatest security is achieved in the distributed system. In FIG. 4, incoming E-mail 110, which is public key encrypted, is sent to a primary recipient's mailbox 430. In this system there is also a group of proxy servers 420 (system administrators) who maintain the E-mail system 400. From the group of proxy servers 420 a quorum of proxy servers 425 is selected to act as the proxy. One of the functions of the quorum of proxy servers 425 involves forwarding E-mail from a primary recipient's mailbox 420 to some number of secondary recipient's mailboxes when the primary recipient is unavailable. The choice of secondary recipients can be made according to rules that specify, for example, that all E-mail from a certain sender always gets routed to a certain secondary recipient; at random; according to the time and date; or according to other rules, which may involve routing information sent by the sender with the encrypted message. These locations can be either internal or external to the E-mail system 400. For example, if the primary recipient is on vacation or home sick, then the primary recipient could have the quorum of proxy servers 425 forward the E-mail to the primary recipient's home E-mail address 440, a secretary's mailbox 450, a coworker's mailbox 460, and/or archived to a local or network harddisk 470.

In general, to perform the forwarding function, a proxy must be able to transform a transcript (for example, an encrypted E-mail message) from being associated with the primary recipient to instead being associated with the secondary recipient. In this system the proxy only needs to know the primary recipient's secret key, or some transformation key derived from the primary recipient's secret key. In this embodiment of the present invention, since the proxy is distributed among a quorum of proxy servers, the transformation is controlled by the use of quorum action. Also, in this embodiment, the actual E-mail message remains hidden from the quorum of proxy servers, provided the entire quorum remains honest and does not, as a group, decrypt and read the message in the transformed E-mail. While the exact membership of the quorum does not need to be identified until the time of the transformation, the minimum number of members in the quorum must be specified by the primary recipient before the secret key is shared among a quorum of the proxy servers. In one embodiment, at the time of transformation, each participating proxy server computes an unweighted transcript using his unweighted share of the allocated secret key. Then, based on which proxy servers actually participated, the unweighted transcripts are first Lagrange-weighted and then combined into the final transcript. In another embodiment, at the time of transformation, each participating proxy server computes a new, Lagrange-weighted share from his share after he learns what servers are participating. For example, in a group of five (5) proxy servers, if the primary recipient determines that a minimum of three (3) proxy servers would constitute a quorum, then the secret key would be allocated into three shares for use by three proxy servers. If more than the minimum number of quorum proxy servers come together to transform the message, then the transcripts from the additional proxy servers can be ignored and the final transcript can be produced from the previously specified number of quorum proxy servers. In the above example of three proxy servers, if four proxy servers come together and each produce transcripts, then one of them can be ignored and the final transcript is produced from the other three.

To transform the E-mail message to permit it to be forwarded on to secondary recipients, each proxy server in the quorum uses the part of the primary recipient's secret key assigned to that proxy server in the quorum to transform a part of the message. This transformation process can occur either in parallel or serially. Additional security can be achieved by using proactive secret sharing schemes. These "proactive secret sharing schemes" alter the individual proxy server shares during every time period in a manner that does not change what secret is shared, but prevents mobile attackers from learning any information from any corrupted proxy servers. A "mobile attacker" is an attacker that can corrupt a certain portion of a set of proxy servers for each time period, and for each time period can choose a new set of proxy servers to corrupt.

If the transformation is done in parallel, each proxy server in the quorum transforms an identical copy of the primary recipient's message and then the separate transforms are combined into the final re-encrypted message. If done serially, each proxy server in turn transforms the results passed to it from the previous proxy server with the exception of the first proxy server who transforms the original primary recipient's message. In the serial mode, the proxy servers can transform the encrypted message in any order, for example, with a quorum of three proxy servers the transformation can be performed in 3 factorial (3!) or six (6) different orders. In the serial and parallel methods, after the final proxy server has finished transforming the message, the final re-encrypted version of the message exists.

The following discussion provides the necessary assumptions and requirements for and proof of my invention.

The proxy, whose public key is $y_1$, receives a transcript $E_1$, which can be an ElGamal, or an ElGamal encryption based on Elliptic Curves or an ElGamal related encryption for which my principles can be applied of a message m using $y_1$ which meets the criteria set forth below for a representative encryption algorithm. The proxy produces and outputs a transcript $E_2$, which is, for example, an ElGamal, or an ElGamal encryption based on Elliptic Curves or an ElGamal related encryption for which my principles can be applied of the same message m, but using a given public key $y_2$.

The transformation is controlled by the use of quorum actions. Assume that there is no set of cheating proxy servers containing a quorum and make the following commonly employed computational assumption:

The Decision Diffie-Hellman Assumption. Let $p=2q+1$, for primes p and q, and let m, g be generators of a subgroup of order q. Then, the pairs $(m, m^x, g, g^x)$ and $(m, m^r, g, g^x)$ are indistinguishable, for random and unknown values $r, x \in Z_q$, $m, g \in G_p$.

Informally, the requirements on my scheme are:

1. Correctness: Any quorum Q of proxy servers, sharing a secret key $x_1$, will be able to perform the above re-encryption.
2. Robustness: If any proxy server in the transformation protocol outputs incorrect transcripts, then all honest proxy servers will detect the incorrect transcripts. The protocol will allow the honest proxy servers to determine which proxy servers cheated.
3. Asymmetry: The above proxy servers need no information about the secret key $x_2$ corresponding to the secondary receiver's public key $y_2$ in order to perform the computation, and the secondary receiver will need no information about $x_1$ or $y_1$ in order to decrypt $E_2$.
4. Privacy: The proxy re-encryption does not leak any information about m to any set of proxy servers smaller than a quorum of proxy servers.

Let us review some basic definitions:

Public and Secret Information. Let p, q be primes such that $p=2q+1$, and g be a generator of $G_p$. The quorum of proxy servers share a secret key $x_1$ using a (k,n) threshold scheme; their corresponding public key is $y_1=g^{x_1}$ mod p.

(From this point on, assume all arithmetic to be modulo p where applicable, unless otherwise stated.) Likewise, the secondary recipient has a secret key $x_2$ with a corresponding public key $y_2=g^{x_2}$.

ElGamal. One embodiment of my protocol uses ElGamal encryption. To encrypt a value m using the public key y (where, m=(M/p)M for an original message $M \in [1 \ldots (p-1)/2]$ and where (M/p) is the Jacobi symbol of M), a value $\gamma \in_u Z_q$ is picked uniformly at random, and the pair (a, b)=$(my^\gamma, g^\gamma)$ is calculated. Thus, (a, b) is the encryption of m. In order to decrypt this and obtain m, $m=a/b^x$ is calculated.

Consider a situation where there are two secret keys, $x_1$ and $x_2$, corresponding to the public keys $y_1$ and $y_2$, respectively, for $y_i=g^{x_i}$. The holder of the secret keys receives as input two messages $m_1$ and $m_2$, and outputs the "signature" $s=m_1^{x_1}m_2^{x_2}$. Let us consider how the holder can efficiently prove that the output is correct, without revealing either $m_1^{x_1}$ or $m_2^{x_2}$. (Note: if these values could be revealed, then a standard proof of a valid undeniable signature could be used, or related methods based on signature schemes, for example, Schnorr signatures.) In the protocol below, the "verifier" is a proxy server in the quorum of proxy servers and is subsequent to the prover. The "prover" is the proxy server who just performed the last transformation on the encrypted message.

Consider the following protocol:

1. The verifier knows $(g, Y_1, y_2, m_1, m_2, s)$. The verifier selects three values $\alpha, \beta_1, \beta_2$ independently and uniformly at random from $Z_q$, and computes $(q_1, q_2) = (m_1^\alpha g^{\beta_1}, m_2^\alpha g^{\beta_2})$. This pair is sent to the prover.
2. The prover computes $w=q_1^{x_1}q_2^{x_2}$, and sends a commitment c to w to the verifier.
3. The verifier sends $(\alpha, \beta_1, \beta_2)$ to the prover.
4. The prover verifies that $(q_1, q_2)$ were correctly computed (and halts if they were not), and sends w to the verifier.
5. The verifier accepts if $w=s^\alpha y_1^{\beta_1} y_2^{\beta_2}$, otherwise the verifier rejects.

The above protocol is correct, sound, and zero-knowledge. In addition, the above protocol can be made non-interactive using standard methods related to those of Schnorr signatures in order to allow multiple verifiers to verify one proof, thereby boosting efficiency. The resulting non-interactive proof can be proven zero-knowledge in the random oracle model.

Let us first consider a non-robust version of the proxy re-encryption, and then add on a proof to guarantee robustness. In this embodiment the ElGamal encryption algorithm is used.

Let $(a_1,b_1)$ be an ElGamal encryption of a message m with respect to a public key $y_1$, and let $x_1$ be the corresponding secret key, which is shared by the quorum of proxy servers using a threshold scheme. The quorum of proxy servers wish to compute the ElGamal encryption $(a_2,b_2)$ of m with respect to the public key $y_2$. The quorum of proxy servers wish not to expose m to any set of dishonest proxy servers (or any other set of proxy servers); according to my assumptions, the quorum of proxy servers do not know the secret key $x_2$ of $y_2$.

For simplicity of denotation, assume that $x_{1j}$ is the Lagrange-weighted secret key of proxy server j with respect to a given active quorum Q; $Y_{1j}=g^{x_{1j}}$ is the corresponding public key share. The proxy servers in the quorum perform the following computation:

1. Proxy server j selects a random value $\delta_j$ uniformly at random from $Z_q$, and computes $(c_j, d_j)=(b_1^{-x_{1j}}y_2^{\delta_j}, g^{\delta_j})$. This pair is sent to the other proxy servers.

2. The other proxy servers (or alternatively, a non-trusted gateway) compute the pair$(a_2, b_2)=(a_1 \Pi_{j \in Q} d_j)$. The pair $(a_2,b_2)$ is output.

The above protocol for proxy re-encryption is made robust by use of the zero-knowledge proof protocol described above. Thus, after the first step, each proxy server j proves that proxy server j performed the right exponentiation. Here, proxy server j uses the public keys $(y_1,y_2)=(y_{1j}^{-1},d_j)$, for "messages" $(m_1,m_2)=(b_1,g)$ and a "signature" $s=c_j$. Thus, in this step, proxy server j proves that $c_j=b_1^{-x_{1j}}y_2^{\delta_j}$ for $y_{1j}=g^{x_{1j}}$ and $d_j=g^{\delta_j}$, which proves that proxy server j's output is of the correct format.

As is standard, if any proxy server is claimed to be a cheater by a majority of the participating proxy servers, then this proxy server is replaced and the protocol restarted. Given that at least half of the participating proxy servers are honest, all dishonest proxy servers will be replaced after no more than k−1 attempts (which is the maximum number of dishonest proxy servers in my model). After this, the correct output will be produced. If there is a majority of cheaters in the quorum (but yet not a quorum of cheating proxy servers, according to my assumptions) then after the maximum number of failed attempts (in which dishonest proxy servers may exclude honest proxy servers) the largest common set of proxy servers during all the attempts will be declared dishonest, after which they are replaced, and the protocol restarted.

The attached appendix contains the relevant Lemmas, Theorems and associated Proofs that form the basis of my inventive method and system.

What has been described is merely illustrative of the application of the principles of the present invention. Other arrangements and methods can be implemented by those skilled in the art without departing from the spirit and scope of the present invention.

APPENDIX

I hypothesize that the proposed scheme for transformation of transcripts satisfies correctness (theorem 1), robustness (theorem 2), asymmetry (theorem 3), and privacy (theorem 4). I prove that these theorems are true after first proving that the lemmas on which they build are true.

The interactive scheme for proving valid exponentiation is correct (lemma 1), sound (lemma 2), and zero-knowledge (lemma 3).

Lemma 1. The interactive scheme for proving valid exponentiation is correct. If the prover is honest and the correct exponentiation was performed, then the verifier will accept with an overwhelming probability.

Proof of Lemma 1. Assume that $s=m_1^{x_1}m_2^{x_2}$, that $q_1=m_1^\alpha g^{\beta_1}$, and that $q_2=m_2^\alpha g^{\beta_2}$. Then, I have $w=q_1^{x_1}q_2^{x_2}=m_1^{\alpha x_1}g^{\beta_1 x_1}m_2^{\alpha x_2}g^{\beta_2 x_2}=(m_1^{x_1}m_2^{x_2})^\alpha g^{x_1 \beta_1}g^{x_2 \beta_2}$. Given that $y_1=g^{x_1}$, and $y_2=g^{x_2}$, I get that $w=s^\alpha y_1^{\beta_1} y_2^{\beta_2}$, which is the condition under which the verifier accepts. Therefore, the proof is correct.

Lemma 2. The interactive scheme for proving valid exponentiation is sound. If the correct exponentiation was not performed, then the verifier will reject with an overwhelming probability.

Proof of Lemma 2. (Sketch) Assume that it is not the case that $s=m_1^{x_1}m_2^{x_2}$. It is clear that $q_1$ and $q_2$ cannot leak any information about the choice of random variables $\alpha, \beta_1, \beta_2$, given that there are three unknowns (these parameters) but only two equations. Therefore, it is only possible with a negligible probability to guess a reply w such that $w=s^\alpha y_1^{\beta_1} y_2^{\beta_2}$, given that all elements $m_1,m_2,y_1,y_2$ are generators of a large subgroup of $G_p$. Thus, the verifier will only accept with a negligible probability given such an invalid input.

Lemma 3. The interactive scheme for proving valid exponentiation is zero-knowledge. The verifier can simulate transcripts of the protocol that cannot be distinguished from real transcripts.

This can shown by use of a standard rewinding argument in which the simulator commits to a dummy value w, learns $\alpha$, $\beta_1$, $\beta_2$, and then rewinds to commit to the "correct" value w. Given that it is not possible to find collisions for the verifier (corresponding to multiple possible values for $\alpha$, $\beta_1$, $\beta_2$) the simulation, which runs in polynomial time, produces transcripts that are indistinguishable from real transcripts. I note that finding collisions is only possible if the representation problem is easy, in which case it is easy to find discrete logarithms, and the protocol trivially becomes zero-knowledge by the removal of the "computational barrier."

Theorem 1. The transformation scheme satisfies correctness. If $E_1$ is an encryption of m with respect to $y_1$, then the output of the scheme will be $E_2$, an encryption of m with respect to, $y_2$, for a value $y_2$ chosen by the proxy.

Proof of Theorem 1. (Sketch) Assume, for example, that $(a_1, b_1) = (my_1^\gamma, g^\gamma)$, that is, $(a_1, b_1)$ is a valid ElGamal encryption of a message m with respect to the proxy's public key $y_1$. I have that $(c_j, d_j) = (b_1^{-x_{1j}} y_2^{\delta_j}, g^{\delta_j})$, for an already Lagrange-weighted (with respect to the quorum Q) secret key share $x_{1j}$ of proxy server j, and a random number $\delta_j$. Then, I have that $(a_2, b_2) = (a_1 \Pi_{j \in Q} c_j, \Pi_{j \in Q} d_j)$. I therefore have that $a_2 = a_1 b_1^{-x_1} y_2^\delta$, for $\delta = \Sigma_{j \in Q} \delta_j$ mod q, and $x_1 = \Sigma_{j \in Q} x_{1j}$ mod q. Recall that $y_1 = g^{x_1}$. Thus, $a_2 = m y_2^\delta$, according to the decryption algorithm for ElGamal encryption. Since $b_2 = \Pi_{j \in Q} d_j = g^\delta$, I have that $(a_2, b_2)$ is a valid ElGamal encryption of the message m with respect to the public key $y_2$, and thus, the transformation protocol is correct. Likewise, the robust version, in which the proof of correct exponentiation is added, must also be correct.

Theorem 2. The scheme satisfies robustness. If any participating proxy outputs a transcript that would result in an incorrect end result, then the honest proxy servers will detect this, and will be able to determine the cheating proxy's identity.

Proof of Theorem 2. If any proxy server should use another public key $y_2$ for the secondary recipient than what was agreed upon, or another incoming encryption other than $E_1 = (a_1, b_1)$, then this will result in the other proxy servers (corresponding to the verifiers of the proof of correct exponentiation) detecting this cheating proxy server (given that the protocol for proving correct exponentiation is sound, which was shown in lemma 2). Given that there is a majority of honest proxy servers, they will force the replacement of the cheating proxy servers, after which the transformation protocol will be restarted (I note that this will not affect its simulability.) Therefore, a correct output will only be output when there is a quorum of honest proxy servers available among all the proxy servers, and there is no set of dishonest proxy servers that includes a quorum of proxy servers (which is my assumption).

Theorem 3. The scheme satisfies asymmetry. This is obvious given the specification of the protocol; the proxy servers never need any secret information corresponding to the public key $y_2$ of the secondary recipient, nor does the secondary recipient need any secret information apart from this secret key in order to decrypt the received transcript.

Theorem 4. The scheme satisfies privacy. Let A be a set of proxy servers not containing a quorum. A can simulate transcripts such that these cannot be distinguished by A from transcripts of the transformation protocol, other than with a negligible probability.

Proof of Theorem 4. (Sketch) Let $E_2$ be a value that cannot be distinguished by A from a valid re-encryption (according to the given public keys) of the input $E_1$. (For example, for ElGamal encryption, it is commonly believed that any pair of randomly chosen elements from $G_p$ may be chosen as such a value $E_2$, given no partial knowledge of the corresponding decryption key $x_2$.) Let us assume that the secret key $x_2$ needed to decrypt the transformed encryption is not known by any proxy servers. Focusing on the non-robust transformation protocol only, one can then show that the view of a set of proxy servers not containing a quorum can be simulated, following the (somewhat space-consuming) method used for proving the simulability of two related protocols, namely those for proactive key update and for distributed signature generation. The same result will be obtained when such a protocol is interleaved (a constant and low number of times) with a protocol that is zero-knowledge. Therefore, the robust transformation protocol has the property that a partial view (corresponding to the views of a set of proxy servers not containing a quorum) is simulable in p-time, and the simulated transcripts cannot be distinguished (by the same set of proxy servers) from real transcripts. This argument also holds for a serial concatenation of protocol executions (following the proof method in Herzberg, Jakobsson et al.), and thus, is valid even when cheating proxy servers corrupt the protocol and force a restart of the same.

In more detail, the simulator will compute transcripts according to the inputs given by A, and select transcripts for the appropriate distributions from the proxy servers not controlled by A. This is done so that the resulting output is $E_2$. The simulator then simulates the zero-knowledge proofs for the honest proxy servers (that is, those not controlled by A), giving transcripts showing that these transcripts are valid and correspond to the previously set outputs of these proxy servers. I note that it will not be possible for A to distinguish transcripts in a simulation where a false statement is "proven" from transcripts from a simulation of a true statement (and therefore also not from real transcripts.) If this were not the case, then it would not be hard to decide whether a given input is valid or not, without the interaction of the prover, which in turn would violate my computational assumption.

I claim:

1. A method of forwarding an encrypted message sent to a primary recipient having a secret key to at least one secondary recipient comprising the steps of sharing portions of said secret key among a plurality of proxy servers, upon receipt of an encrypted message by said plurality of proxy servers, each of said plurality of proxy servers modifying said encrypted message by applying said key portion to said encrypted message, the result of said modifications comprising a message secret to said plurality of proxy servers but decryptable by said at least one secondary recipient, forwarding said resultant encrypted message to said at least one secondary recipient, and a first one of said plurality of proxy servers modifying said encrypted message followed by a second one of said plurality of proxy servers modifying said encrypted message and verifying said first one of said plurality of proxy servers' modification of said encrypted message.

2. A method of forwarding an encrypted message according to claim 1 wherein the number of members in said plurality of proxy servers is equal to a predetermined threshold number that is specified by said primary recipient.

3. A method of forwarding an encrypted message according to claim 1 wherein said encrypted message is encrypted according to an ElGamal encryption algorithm.

4. A method of forwarding an encrypted message according to claim 1 wherein said encrypted message is encrypted according to an ElGamal encryption based on at least one of Elliptic Curves or an ElGamal related encryption.

5. A method of forwarding an encrypted message according to claim 1 further comprising the step of
verifying a modification of said encrypted message by one of said plurality of proxy servers.

6. A method of forwarding an encrypted message as recited in claim 5 further comprising the steps of
all said plurality of proxy servers verifying a modification of said encrypted message, and
signing their respective modification.

7. A method of forwarding an encrypted message as recited in claim 1 wherein said step of modifying said encrypted message by applying a key portion comprises the substeps of encrypting and decrypting said encrypted message.

8. A method of forwarding an encrypted message as recited in claim 7 wherein said substeps of encryption and decryption of said encrypted message comprise partially decrypting and then encrypting said partially decrypted encrypted message occur in the order of decryption followed by encryption.

9. A method of forwarding an encrypted message as recited in claim 7 wherein said substeps of encryption and decryption of said encrypted message comprise partially encrypting and then decrypting said partially encrypted encrypted message occur in the order of encryption followed by decryption.

10. A method of forwarding an encrypted message as recited in claim 7 wherein said substeps of encryption and decryption of said encrypted message by said plurality of proxy servers occurs in parallel.

11. A method of forwarding an encrypted message as recited in claim 7 wherein said substeps of encryption and decryption of said encrypted message by said plurality of proxy servers occurs serially.

12. A method of forwarding an encrypted message as recited in claim 1 wherein the number of members in said plurality of proxy servers is determined by said primary recipient and comprises a quorum of a predetermined total number of proxy servers.

13. A method of forwarding an encrypted message as recited in claim 1 wherein said plurality of proxy servers modifications of said encrypted message may occur in any order of said plurality of proxy servers.

14. A method of forwarding an encrypted message as recited in claim 1 wherein said shared portion of said secret key is shared among said plurality of proxy servers using proactive secret sharing methods to protect against a mobile attacker who can corrupt any non-quorum of servers for any time period.

15. A method of forwarding an encrypted message as recited in claim 1 wherein said encrypted message comprises data identifying said primary recipient.

16. A method of forwarding an encrypted message as recited in claim 15 wherein said data identifying said primary recipient is received encrypted by a key accessible to each of said plurality of proxy servers.

17. A method of forwarding an encrypted message as recited in claim 16 further comprising the step of
decrypting the identity of said primary recipient by at least one of said plurality of proxy servers via said accessible key.

18. A method of forwarding an encrypted message as recited in claim 1 further comprising the step of
decrypting said resultant secret encrypted message by said secondary recipient via a secret key of said secondary recipient.

19. An apparatus for forwarding an encrypted message sent to a primary recipient having a secret key to at least one secondary recipient comprising
a means for sharing portions of said secret key among a plurality of proxy servers,
a means for each of said plurality of proxy servers to modify said encrypted message by applying said key portion to said encrypted message, the result of said modifications comprising a message secret to said plurality of proxy servers but decryptable by said at least one secondary recipient, and
a means for forwarding said resultant encrypted message to said at least one secondary recipient,
wherein a first one of said plurality of proxy servers modifies said encrypted message followed by a second one of said plurality of proxy servers modifying said encrypted message and verifying said first one of said plurality of proxy servers' modification of said encrypted message.

20. The apparatus as recited in claim 19 wherein the means for forwarding said resultant encrypted message comprises an E-mail communication system.

21. The apparatus as recited in claim 19 wherein said plurality of proxy servers comprising a quorum of a predetermined total number of proxy servers.

22. A communication system for forwarding an encrypted message sent to a primary recipient having a secret key to at least one secondary recipient, said communication system comprising
a first memory for said primary recipient for receiving and sending said encrypted messages,
a plurality of second memories, wherein each of said second memories is associated with one of said at least one secondary recipient for receiving and sending said encrypted messages,
a plurality of proxy servers for administering said communication system,
a quorum of proxy servers selected from said plurality of proxy servers for forwarding said encrypted message sent to said first memory of said primary recipient to each of said plurality of second memories of said at least one secondary recipient, and
a means for sending and receiving said encrypted messages between said first memory of said primary recipient to each of said plurality of second memories of said at least one secondary recipient,
wherein a first one of said quorum of proxy servers modifies said encrypted message followed by a second one of said quorum of proxy servers modifying said encrypted message and verifying said first one of said quorum of proxy servers' modification of said encrypted message.

23. The communication system as recited in claim 22 wherein the number of members in said quorum of proxy servers is determined by said primary recipient.

24. The communication system as recited in claim 22 wherein the means for sending and receiving said encrypted messages comprises an E-main communication system.

25. A computer-readable medium having computer-executable instructions for performing the step comprising forwarding an encrypted message sent to a primary recipient having a secret key in a form decryptable by at least one secondary recipient wherein said forwarding step comprises the substeps of
  (a) outputting portions of said secret key to a plurality of proxy servers,
  (b) receiving said encrypted message by said plurality of proxy servers,
  (c) applying each said key portion to modify said encrypted message, the result of said modifications comprising an encrypted message secret to said plurality of proxy servers but decryptable by said at least one secondary recipient, and
  (d) forwarding said resultant encrypted message to said at least one secondary recipient,
  wherein a first one of said plurality of proxy servers modifies said encrypted message followed by a second one of said plurality of proxy servers modifying said encrypted message and verifying said first one of said plurality of proxy servers' modification of said encrypted message.

26. A computer-readable medium having computer-executable instructions as recited in claim 25 wherein the number of members in said plurality of proxy servers is determined by said primary recipient and comprises a quorum of a predetermined total number of proxy servers.

27. A computer-readable medium having computer-executable instructions for performing the step comprising forwarding an encrypted message sent to a primary recipient having a secret key in a form decryptable by at least one secondary recipient wherein said forwarding step comprises the substeps of
  (a) outputting portions of said secret key from a communication system to a plurality of proxy servers,
  (b) sending said encrypted message from said communication system to said plurality of proxy servers,
  (c) receiving a resultant encrypted message in said communication system from said plurality of proxy servers, and
  (d) forwarding said resultant encrypted message from said communication system to said at least one secondary recipient,
  wherein a first one of said plurality of proxy servers modifies said encrypted message followed by a second one of said plurality of proxy servers modifying said encrypted message and verifying said first one of said plurality of proxy servers' modification of said encrypted message.

28. A computer-readable medium having computer-executable instructions as recited in claim 27 wherein the number of members in said plurality of proxy servers is determined by said primary recipient and comprises a quorum of a predetermined total number of proxy servers.

29. A computer-readable medium having computer-executable instruction for performing the steps comprising
  (a) receiving portions of a secret key form a communication system by a plurality of proxy servers,
  (b) receiving an encrypted message from said communication system by said plurality of proxy servers,
  (c) applying each said key portion to modify said encrypted message, the result of said modifications comprising an encrypted message secret to said plurality of proxy servers but decryptable by said at least one secondary recipient, and
  (d) sending said resultant encrypted message to said communication system from said plurality of proxy servers,
  wherein a first one of said plurality of proxy servers modifies said encrypted message followed by a second one of said plurality of proxy servers modifying said encrypted message and verifying said first one of said plurality of proxy servers' modification of said encrypted message.

30. A computer-readable medium having computer-executable instructions as recited in claim 29 wherein the number of members in said plurality of proxy servers is determined by said primary recipient and comprises a quorum of a predetermined total number of proxy servers.

* * * * *